United States Patent Office 3,572,276
Patented Mar. 23, 1971

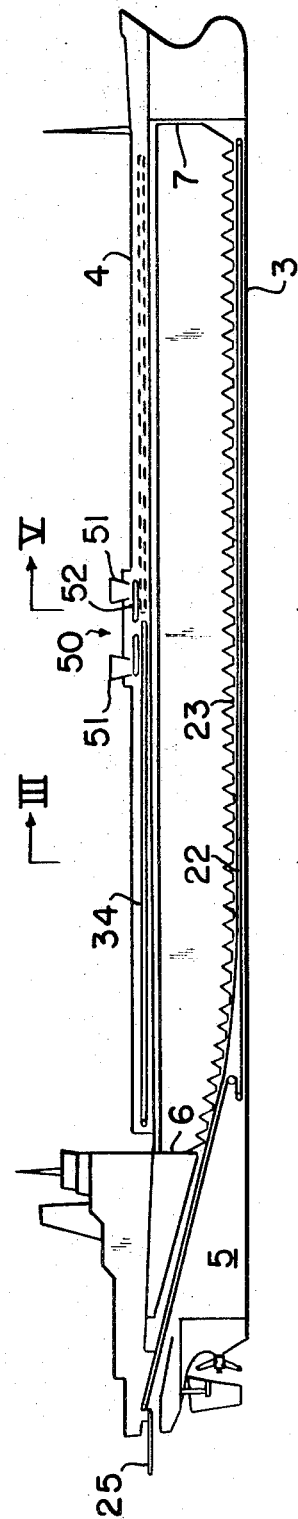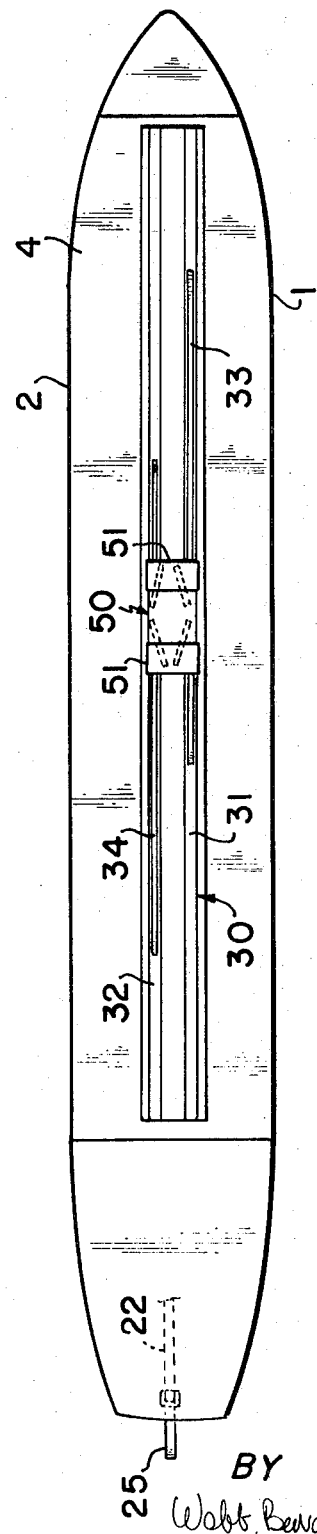

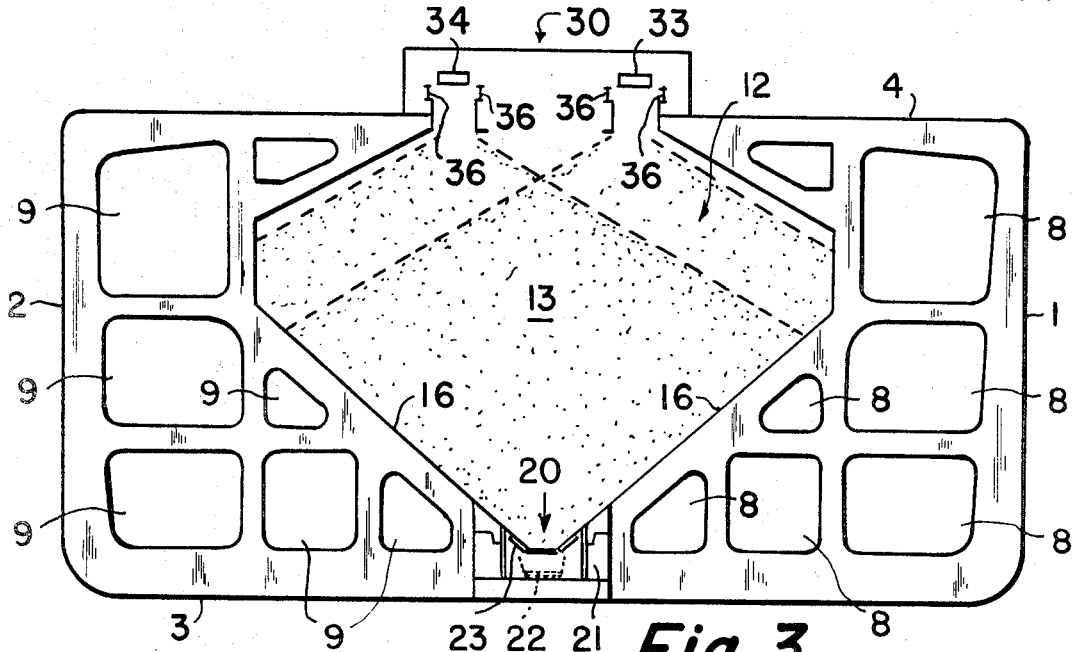
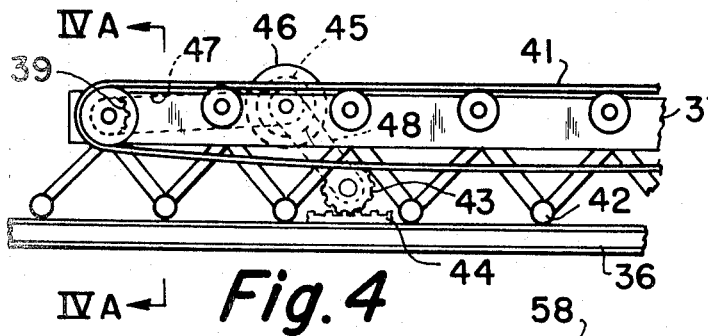
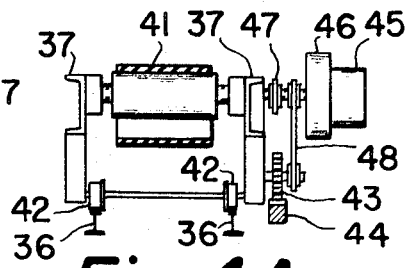
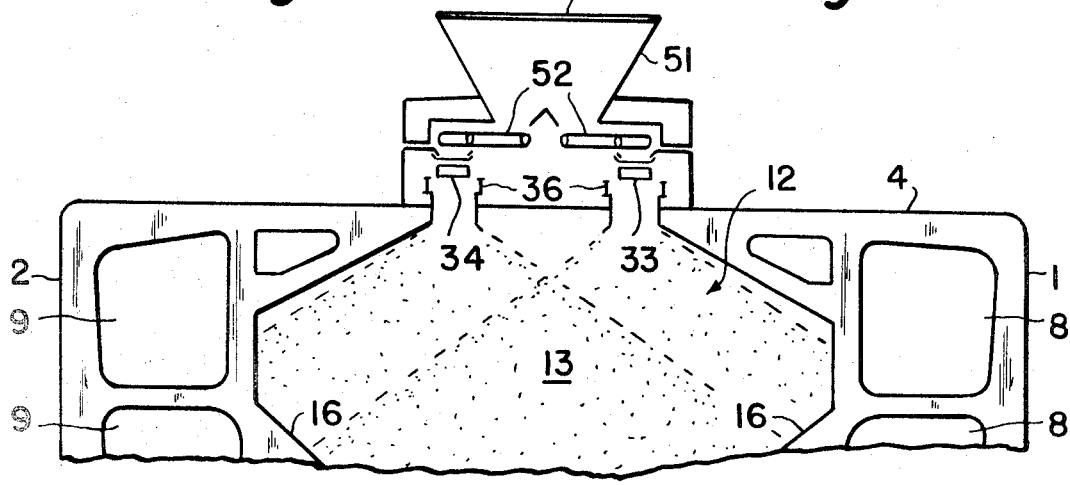

3,572,276
SELF-LOADING AND UNLOADING VESSEL
Ole Skaarup, Greenwich, Conn. (% Skaarup Shipping Corp., 21 West St., New York, N.Y. 10006)
Filed Apr. 14, 1969, Ser. No. 815,908
Int. Cl. B63b 25/02
U.S. Cl. 114—73                                    5 Claims

ABSTRACT OF THE DISCLOSURE

A self-loading and unloading dual cargo vessel for carrying a fluid cargo and a particulate bulk cargo. The vessel comprises marginal fluid cargo holds and a central bulk cargo hold therebetween. The bulk cargo hold has inclined lower sides which converge to deliver the bulk cargo to an unloading conveyor system. There is at least one longitudinal loading trench in the uper deck over the bulk cargo hold spanning substantially the entire fore and aft dimensions of the hold. A mobile and reversible conveyor is positioned over the trench and extends over approximately one-half the length of the trench. The mobile conveyor is positionable to deliver bulk cargo over substantially any longitudinal position in the hold. A loading device comprising at least one hopper is located amidships or in another suitable position for feeding the mobile conveyor. The mobile conveyor and trench are permanently enclosed.

This invention relates to a self-loading and unloading dual cargo vessel for carrying a fluid cargo such as oil and a particulate bulk cargo such as ores, concentrates, pellets, grain, or other free flowing commodities. Instead of conventional hatches the vessel is constructed with at least one longitudinal trench spanning substantially the entire length of the bulk cargo hold. A mobile and reversible conveyor is positioned over the trench and extends over approximately one-half the length of the trench. The conveyor is positionable to deliver bulk cargo from one end or the other over substantially any longitudinal position in the hold.

Vessels according to this invention are advantageous because they require only rather simple shore equipment for loading and unloading. Thus, the number of docks at which they may be loaded and unloaded is increased. The absence of hatches in vessels according to this invention simplifies the structural design of the vessel and eliminates equipment generally necessary for removal and replacement of hatches. Furthermore, eliminating the hatches provides for better sealability of the bulk cargo hold. These vessels may be loaded in a uniform manner whereby the trim may be controlled and stresses in the vessel may be minimized. Several advantages reside in the fact that the vessel is designed to carry both fluid cargos and particulate bulk cargoes either simultaneously or one at a time. Typical hopper bottom self-discharging vessels for hauling only bulk cargos have considerable wasted space beneath the inclined hold walls. In vessels according to this invention, this space is conveniently filled with fluid cargo such as oil. Combining two types of cargo holds in one vessel substantially increases the back hauling combinations that can be achieved with this vessel thereby increasing its efficiency. As the bulk cargo is self-loading and unloading in a continuous manner, the rapid loading and unloading of the bulk cargo matches the loading and unloading times for the fluid cargo making port time approximately the same for either operation, still further increasing the efficiency of the vessel.

Further features and other objects and advantages of this invention will become clear to one skilled in the art from a study of the following detailed description made with reference to the drawings in which:

FIG. 1 is a profile view of a section down the center line of the dual cargo vessel according to this invention;

FIG. 2 is a plan view of the upper deck of a dual cargo vessel according to this invention.

FIG. 3 is a transverse section view of a vessel shown in FIGS. 1 and 2 taken along lines III—III;

FIG. 4 is a blown-up side view of the mobile conveyor system;

FIG. 4A is a blown-up transverse section of the mobile conveyor system taken along lines VIA—VIA in FIG. 4;

FIG. 5 is a transverse section view of the vessel shown in FIGS. 1 and 2 taken along the lines V—V;

Figure 6:
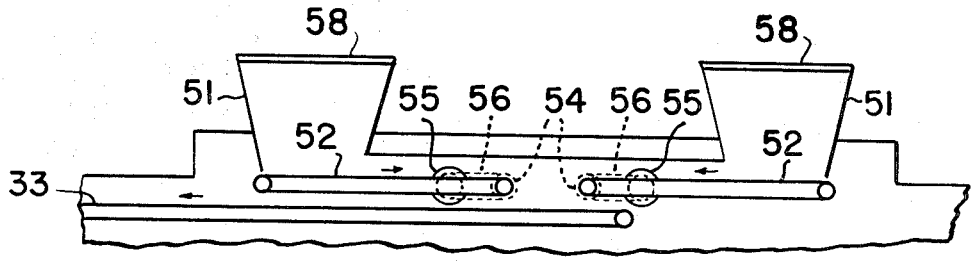
FIG. 6 is a blown-up side view of the loading system.

Referring now to FIGS. 1, 2 and 3, vessels according to this invention have a starboard bulkhead 1, a port bulkhead 2, a bottom 3, an upper deck 4 and two transverse bulkheads 6 and 7 which substantially define the hold space. At the aft end there is an engine room 5. Marginal fluid holds 8 and 9 are adjacent the port and starboard bulkheads. A bulk cargo hold 12 is positioned therebetween and is shown filled with a particulate cargo 13. The lower walls 16 of the bulk cargo hold are inclined to converge and deliver bulk cargo to an unloading conveyor system 20. A tunnel 21 runs the length of the bulk cargo hold and contains a conveyor 22 which removes bulk cargo to the aft of the ship, thence up an inclined conveyor through the engine room where it delivers the cargo to a retractable shuttle conveyor 25 that is designed to match a receiving hopper ashore. The bulk cargo hold is separated from the conveyor tunnel by a plurality of gates 23 which control flow of the bulk cargo from the hold to the unloading conveyor thereby enabling the more or less uniform unloading of the bulk cargo. It should be noticed that the entire dry or bulk cargo compartment and belt system is enclosed in a water-tight compartment separate from the remainder of the vessel's hull space designed to carry oil or other liquid commodities.

The bulk cargo hold has a loading system 30 comprising at least one longitudinal loading trench 31 in the upper deck 4 spanning substantially the entire fore and aft dimensions of the hold. There is a mobile and reversible conveyor 33 positioned over the trench which extends over approximately one-half the length of the trench. The conveyor is positionable to deliver bulk cargo from one or the other end to substantially any longitudinal position in the hold. It is possible according to a preferred embodiment of this invention for the conveyor 33 to be continuously operated and continuously moved fore and aft thereby filling the hold in a more or less uniform manner.

Referring now to FIGS. 4 and 4A, at the edges of the trench 31, there are rails or tracks 36. The conveyor is built upon a frame 37 to which are secured wheels 42 for traversing said rails. According to an embodiment of this invention, alongside one of the rails is a rack 44 which can be engaged by a drive pinion 43 fixed to the conveyor frame and located near one end thereof. In this way, one motor 45 and a transmission 46 can be used to move the conveyor along the trench 31 and also move the conveyor belt 41. Specifically, the conveyor belt is moved by engaging a drive sprocket 39 on the end thereof. Power may be transferred from the motor to the drive sprocket by a chain drive 47 and to the drive wheel by a chain drive 48. The motor according to a preferred embodiment of this invention contains a transmission 46 which enables the direction of the conveyor belt and the direction of the conveyor to be moved simultaneously in either direction as desired.

Figure 6A:
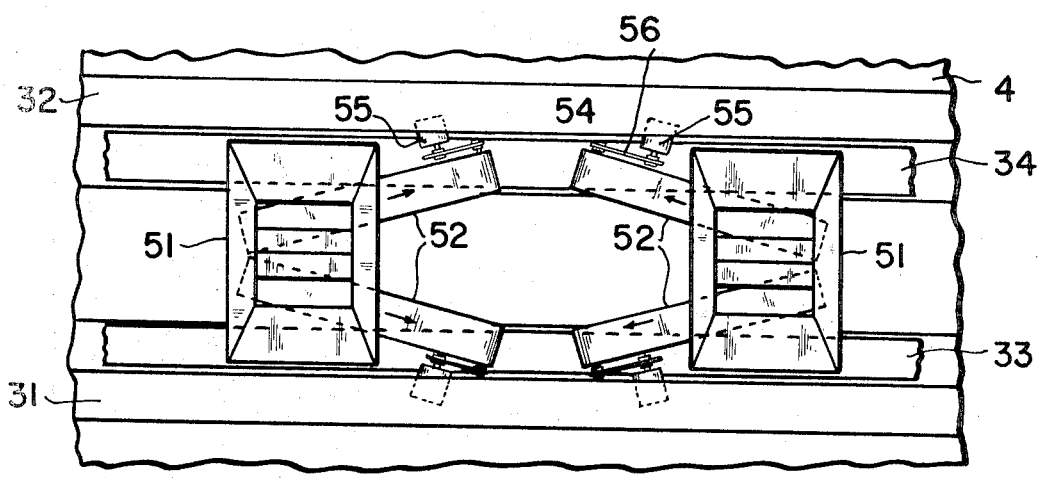
FIG. 6A is a blown-up plan view of the loading system.

Referring now to FIGS. 5, 6 and 6A, a loading means 50 comprising at least one hopper 51 is located amidships or in another suitable position for loading the mobile conveyors. According to a preferred embodiment of this invention, the bottom of the conveyor is provided with a system for controlling the flow of the bulk cargo from the hopper to the mobile conyeor. One hatch 58 is provided for sealing the hopper. According to a preferred mode of practicing this invention, there are two trenches 31 and 32 extending the substantially entire distance fore and aft and two mobile conveyors 33 and 34 positioned therein. In this instance, the mobile conveyors may be fed by a loading device comprising at least one hopper and two individually controllable short conveyors 52 positioned to be fed by the hopper and to deliver cargo to the mobile conveyors. Each short conveyor has its own motor 55, drive sprocket 54 and chain drive 56. In some instances, it is even desirable to provide two loading devices each including one hopper and two short conveyors.

Figure 7:
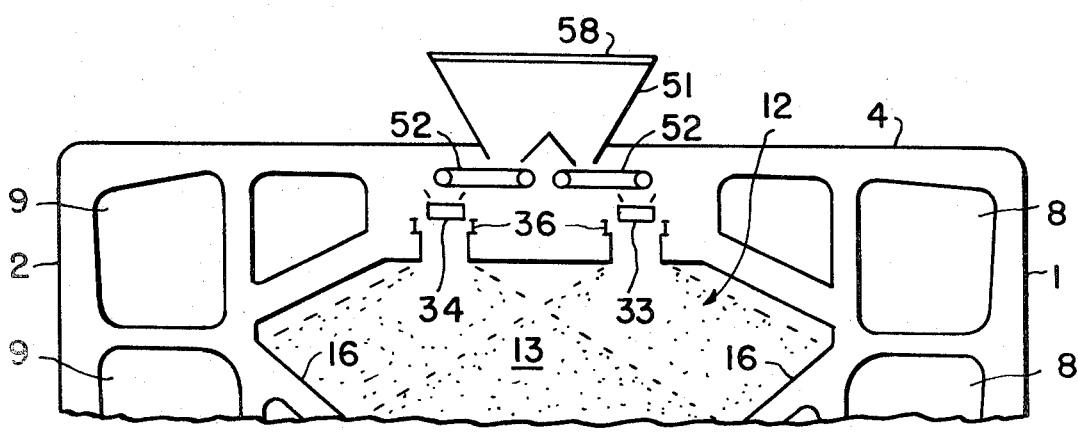
FIG. 7 is amidships section view of an alternate embodiment according to this invention in which the mobile conveyors are suspended below the upper deck.

Referring now to FIG. 7, according to a preferred embodiment shown therein the entire mobile conveyor is suspended below the upper deck.

A two belt loading system according to this invention will achieve a loading speed of up to 15,000 tons per hour of ore by using a 63-inch belt with a belt speed of 650 feet per minute. Different belt sizes and speeds can be employed to match the requirement of the particular vessel. The loading system which is designed to receive bulk cargo at one point simplifies the loading equipment ashore and the construction costs of loading facilities. Ships according to this invention will receive cargo from a stationary installation with simple tieup facilities for the vessel. Where traveling shiploaders are available, time will be saved through the continuous operation without the requirement for traveling during the loading operation. Each of the several systems in the vessel cooperate, for example, the conveyorized unloading system enables the elimination of hatches and, therefore, the use of the conveyorized loading system.

Having thus described my invention with the detail and particularly required by the patent laws, what is desired to have covered by Letters Patent is as follows.

I claim:

1. A dual cargo vessel for carrying a fluid cargo and a particulate bulk cargo having a starboard bulkhead, a port bulkhead, a bottom, an upper deck and two transverse bulkheads defining the hold space, said hold space comprising two marignal fluid cargo holds and a central bulk cargo hold therebetween, the bulk cargo hold having inclined lower sides which converge to deliver the bulk cargo to an unloading conveyor system, said bulk cargo hold having at least one longitudinally loading trench in the upper deck extending substantially the entire fore and aft dimensions of the hold, there being a mobile and reversible conveyor positioned over the cargo hold and within the vertical projection of the trench which extends approximately one-half the length of the trench, said conveyor positionable to deliver bulk cargo over substantially any longitudinal position in the hold, a means comprising at least one hopper for loading the conveyor, said conveyor and trench being entirely enclosed.

2. A dual cargo vessel according to claim 1 comprising two longitudinal loading trenches in the upper deck extending substantially the entire fore and aft dimensions of the hold, each having a mobile and reversible conveyor positioned over it which extends approximately one-half the length of the trench and is positionable to deliver cargo over substantially any longitudinal position in the hold, a means comprising at least one hopper for loading the two conveyors simultaneously.

3. A dual cargo vessel according to claim 2 having a loading means comprising two individually controllable short conveyors positioned to be fed by one hopper, said short conveyors each delivering to one of the mobile conveyors.

4. A dual cargo vessel according to claim 3 comprising at least two loading means.

5. A dual cargo vessel according to claim 1 in which the entire mobile conveyor is suspended below the upper deck.

References Cited
UNITED STATES PATENTS

| | | | |
|---|---|---|---|
| 1,808,862 | 6/1931 | Peterson | 214—15 |
| 2,827,181 | 3/1958 | Bartenfeld | 214—15 |
| 3,009,586 | 11/1961 | Isbrandtsen et al. | 214—15 |
| 3,033,150 | 5/1962 | Pickrell, Jr. | 14—73 |

MILTON BUCHLER, Primary Examiner

F. K. YEE, Assistant Examiner

U.S. Cl. X.R.

214—15